(12) United States Patent
Gosling

(10) Patent No.: US 7,066,699 B2
(45) Date of Patent: *Jun. 27, 2006

(54) TENSIONING APPARATUS AND METHOD

(75) Inventor: Martin Charles Gosling, Burnstown (CA)

(73) Assignee: Siemens Westinghouse Power Corporation, Orlando, FL (US)

( * ) Notice: Subject to any disclaimer, the term of this patent is extended or adjusted under 35 U.S.C. 154(b) by 293 days.

This patent is subject to a terminal disclaimer.

(21) Appl. No.: 10/456,038

(22) Filed: Jun. 6, 2003

(65) Prior Publication Data

US 2004/0115024 A1 Jun. 17, 2004

Related U.S. Application Data

(63) Continuation-in-part of application No. 10/320,775, filed on Dec. 16, 2002.

(51) Int. Cl.
*F16B 31/00* (2006.01)

(52) U.S. Cl. .................. 411/14.5; 411/339; 411/917; 411/511

(58) Field of Classification Search .............. 411/14.5, 411/916, 918, 339, 511, 512; 403/5, 31; 285/97, 285/106
See application file for complete search history.

(56) References Cited

U.S. PATENT DOCUMENTS

| 2,840,399 A | | 6/1958 | Harless et al. |
| 2,992,479 A | | 7/1961 | Musser et al. |
| 3,216,540 A | * | 11/1965 | Blinn .......................... 403/15 |
| 3,326,585 A | * | 6/1967 | Piecha et al. ................. 403/31 |
| 3,494,642 A | | 2/1970 | Coberty |

(Continued)

FOREIGN PATENT DOCUMENTS

| DE | 44 43 238 A1 | 5/1996 |
| FR | 902 682 A | 9/1945 |
| JP | 58 203214 A | 11/1983 |
| JP | 10-184651 A | 7/1998 |

OTHER PUBLICATIONS

Hydraulics Technology, Inc. HTI's Variable Stud Tensioner is Versatile. www.htico.com.

(Continued)

*Primary Examiner*—Flemming Saether

(57) ABSTRACT

A system (150) and method of tensioning a bolt (44) across a flange assembly (42). A tensioning apparatus (40) includes the bolt and an unthreaded nut (48) connected to the shank member by an interference fit. The interference fit may be selectively relaxed by applying a fluid pressure to a groove (54) between the nut and the bolt. A tensioner (58) is energized by a pressure to pre-load the bolt by pulling on the bolt while pushing on the nut while the interference fit is sufficiently relaxed to allow relative movement between the nut and the bolt. The tensioner is sized to achieve the required pre-load in the bolt at the same working fluid pressure that is necessary to relax the interference fit on the stretched bolt, thus permitting a single pressure source (148) to be used for both functions. Once the pre-load is established, the interference fit is reestablished by releasing pressure to the nut to secure the nut in position for maintaining the closure force across the flange assembly after the tensioner is removed. Because the nut does not need to rotate, the pre-load may be applied directly through the nut without the use of a bridge, thereby eliminating the need for overstressing of the bolt to accommodate seating of the nut once the tensioner is relaxed.

6 Claims, 5 Drawing Sheets

U.S. PATENT DOCUMENTS

| | | | |
|---|---|---|---|
| 3,698,750 A | | 10/1972 | Eastcott et al. |
| 3,707,107 A | | 12/1972 | Bierl |
| 3,837,694 A | | 9/1974 | Frisch et al. |
| 3,947,948 A | * | 4/1976 | Fredriksson et al. ........ 29/426.2 |
| 4,093,052 A | | 6/1978 | Falk |
| 4,105,343 A | * | 8/1978 | Riegler et al. ................. 403/15 |
| 4,124,230 A | | 11/1978 | Ahlstone |
| 4,192,621 A | * | 3/1980 | Barth ........................... 403/15 |
| 4,249,718 A | | 2/1981 | Heaton |
| 4,315,446 A | | 2/1982 | Orban |
| 4,375,926 A | | 3/1983 | Feller |
| 4,523,742 A | | 6/1985 | Reneau |
| 4,525,916 A | * | 7/1985 | Wuhrer ....................... 29/446 |
| 4,535,656 A | | 8/1985 | Orban |
| 4,569,258 A | | 2/1986 | Orban |
| 4,569,506 A | | 2/1986 | Vassalotti |
| 4,659,065 A | | 4/1987 | Simms |
| 4,708,036 A | | 11/1987 | Vossbrinck |
| 4,773,146 A | | 9/1988 | Bunyan |
| 4,844,418 A | | 7/1989 | Cole |
| 4,846,444 A | | 7/1989 | Vassalotti |
| 4,861,181 A | * | 8/1989 | Sundberg ..................... 403/15 |
| 4,981,404 A | | 1/1991 | Chamberlain et al. |
| 4,998,453 A | | 3/1991 | Walton et al. |
| 5,527,015 A | | 6/1996 | Percival-Smith |
| 5,538,379 A | | 7/1996 | Junkers |
| 5,690,458 A | | 11/1997 | Junkers |
| 5,803,436 A | | 9/1998 | Hohmann et al. |
| 5,842,263 A | | 12/1998 | Gosling |
| 5,865,070 A | | 2/1999 | Bornhorst et al. |
| 5,878,490 A | | 3/1999 | Heinold et al. |
| 5,927,157 A | | 7/1999 | Gosling |
| 5,951,222 A | | 9/1999 | Gosling |
| 6,065,737 A | | 5/2000 | Richardson et al. |
| 6,085,929 A | | 7/2000 | Malsbury et al. |
| 6,167,764 B1 | | 1/2001 | Calhoun |
| 6,223,925 B1 | | 5/2001 | Malsbury et al. |
| 6,287,079 B1 | | 9/2001 | Gosling et al. |
| 6,676,323 B1 | | 1/2004 | Oen |

OTHER PUBLICATIONS

Hydraulics Technology, Inc. HTI's Fixed Stud Tensioner is Compact & Economical. www.htico.com.
Hydraulics Technology, Inc. HTI Hydraulic Nuts are Compact, Easy to Use and Accurate. www.htico.com.
Hydraulics Technology, Inc. HTI SubSea Tensioners are Diver Friendly. www.htico.com.
Riverhawk Company. Hydraulic Torque Coupler. www.riverhawk.com.
Riverhawk Company. Riverhawk Hydraulic Tensioner Nut Application Guide, www.riverhawk.com.
Riverhawk Company. Riverhawk Het Series External Stud Tensioner Application Guide. www.riverhawk.com.
SKF Hydraulic Assisted Adapter Sleeve. www.skfusa.com.
SM1011 Computerised Thick Cylinder. www.tecquip.com.
Superbolt Products. www.superbolt.com.
Precision Bolting, Ltd. Superbolt Products and Taper Line® Products. www.precisionbolting.com.
VM25: Stresses in a Long Cylinder. http://sun1.rrzn–user.uni–hannover.de.
VM38: Plastic Loading of a Thick–Walled Cylinder. http://www1.ansys.com.
R. Budig and Baumann, "Fluessiges Haelt Fest. Funktionssicherheit von Drkoelverbaenden Bestimmi Details", Mechanische Verbindungstechnik, VDI Verlag. Dusseldorg, Germany, vol. 13, No. 4, 1989, p. 21, XP000104366.
Hydraics Technology, Inc. HTI's Variable Stud Tensioner is Versatile. www.htico.com.
Hydrauics Technology, Inc. HTI's Fixed Stud Tensioner is Compact & Economical. www.htico.com.
Hydrauics Technology, Inc. HTI Hydraulic Nuts are Compact, Easy to Use and Accurate. www.htico.com.
Hydrauics Technology, Inc. HTI SubSea Tensioners are Diver Friendly. www.htico.com.
Riverhawk Company. Hydraulic Torque Coupler. www.riverhawk.com.
River Company. Riverhawk Hydraulic Tensioner Nut Application Guide. www.riverhawk.com.
Riverhawk Company. Riverhawk Hot Series External Stud Tensioner Application Guide. www.riverhawk.com.
SKF Hydraulic Assisted Adapter Sleeve. www.skfusa.com.
SM1011 Computerised Thick Cylinder. www.tecquip.com.
Superbolt Products. www.superbolt.com.
Precision Bolting. Ltd. Superbolt Products and Taper Line® Products. www.precisionbolting.com.
VM25: Stresses in a Long Cylinder. http://sun1.rrzn–user.uni–hannover.de.
VM38: Plastic Loading of a Thick–Walled Cylinder. http://www1.ansys.com.

* cited by examiner

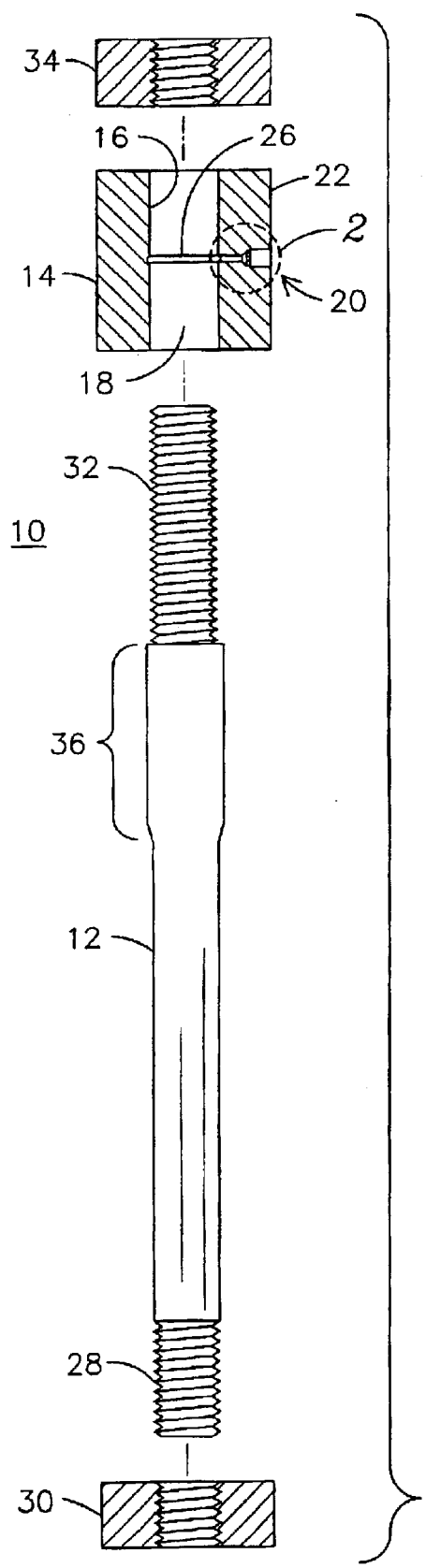
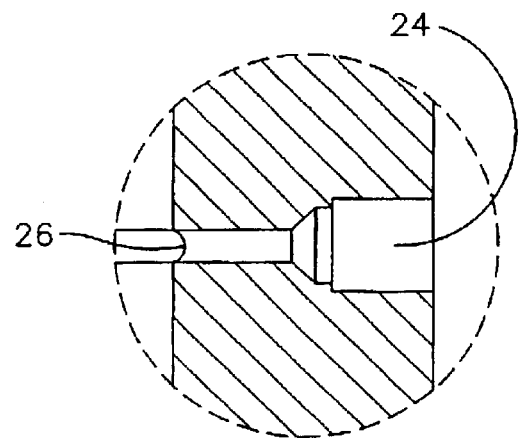
FIG. 2
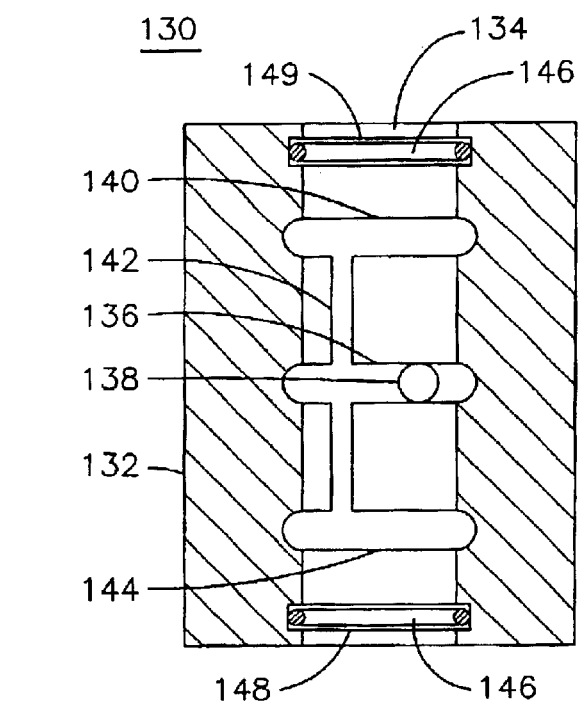
FIG. 7
FIG. 1

TENSIONING APPARATUS AND METHOD

The application is a continuation-in-part and claims benefit of the Dec. 16, 2002, filing date of parent U.S. application Ser. No. 10/320,775.

FIELD OF THE INVENTION

This application relates generally to the field of fasteners, and more specifically to an apparatus and method for tensioning a bolt, stud or similar tension member.

BACKGROUND OF THE INVENTION

A variety of tensioning systems have been devised for imparting a desired amount of closing force to a bolted flange arrangement. For example, a nut may be tightened onto a bolt with a predetermined amount of torque. The accuracy of this method depends upon knowing the amount of friction developed between the nut and the underlying surface, among other factors.

Hydraulic tensioning systems are used to apply a predetermined amount of tensile force to a bolt, with a nut then being positioned on the bolt to maintain the tensile force after the hydraulic tensioning system is removed. The amount of tensile force may be determined by measuring the pressure in the hydraulic system or by measuring the elongation of the bolt. The reactive load applied by a hydraulic tensioning system is carried to the underlying flange surface through a stand that surrounds the bolt and nut. Once the bolt is stretched to a desired tension, the nut is turned down onto the flange with a predetermined amount of torque. Access to the nut is provided through windows formed in the stand. When the tensioner is depressurized, the compressive load in the stand is transferred to the nut. This process may be repeated a second or more times to ensure that the proper amount of pre-load is maintained in the bolt because the nut may "settle in" when it first receives the compressive load from the stand, thereby somewhat relaxing the pre-load on the bolt. Such systems are available through Hydraulics Technology, Inc. (www.htico.com)

In applications where there is insufficient room to use a hydraulic tensioning system, a special hydraulic nut may be used. A hydraulic nut includes an internal piston/cylinder arrangement that allows the nut to expand axially in response to an applied hydraulic pressure, thereby tensioning the engaged bolt. A mechanical portion of the nut is then tightened to hold the nut in its expanded condition after the hydraulic pressure is removed. Such devices are expensive and may depend upon highly precise metal-to-metal seals for high temperature applications. Such devices are available through Riverhawk Company. (www.riverhawk.com)

An alternative to the hydraulic nut is the jackbolt tensioner. A torque nut is applied to a hand-tight condition. A plurality of jackbolts are threaded through the torque nut to push the torque nut away from the flange surface to tension the bolt. A hardened washer is placed between the jackbolts and the flange surface to protect against harmful load concentrations. Such devices are available through Superbolt, Inc. (www.superbolt.com)

SUMMARY OF THE INVENTION

There is an ongoing need for improved tensioning systems and methods that are accurate, that are simple to manufacture and inexpensive to use, that require a minimum amount of space surrounding the bolt and nut, that reduce the likelihood of galling and thread damage, and that protect the fastener and the underlying flange from over-stress conditions.

A tensioning apparatus is described herein as including: a shank member; an annular member comprising an opening sized to receive the shank member with an interference fit; a fluid passageway for delivering a pressure between the shank member and the annular member for expanding the opening to relax the interference fit; a tensioner responsive to a pressure to apply a force to tension the shank member; wherein a first pressure is required in the fluid passageway to relax the interference fit when the shank member is relaxed, and a second pressure lower than the first pressure is required in the fluid passageway to relax the interference fit when the shank member is tensioned; and wherein the tensioner is selected to provide a desired tensioning force to the shank member at the second pressure so that a single pressure source may be used to provide pressure to the fluid passageway and to the tensioner to achieve a desired preload in the shank member. The tensioning apparatus may include: a pump; a first valve connected between the pump and the fluid passageway; and a second valve connected between the pump and the tensioner. This may include: a piston disposed within a cylinder to define a pressure chamber; a first of the piston and cylinder connected to the shank member for applying the force to tension the shank member and a second of the piston and cylinder connected to the annular member for applying a reaction force through the annular member.

A tensioning apparatus is further described as including: a shank member; an annular member comprising an opening sized to receive the shank member with an interference fit; a fluid passageway for delivering a pressure between the shank member and the annular member for expanding the opening to relax the interference fit; a tensioner responsive to a pressure to apply a force to tension the shank member; and a single pressure source fluidly connected to the fluid passageway and to the tensioner for tensioning the shank member with the interference fit relaxed. A method of tensioning a shank member includes the steps of: providing an annular member having an opening receiving a shank member with an interference fit there between; expanding the opening with a first pressure to relax the interference fit; applying a second pressure to a tensioner to tension the shank member; and releasing the first pressure to reestablish the interference fit to retain the shank member tension when the second pressure is relaxed.

BRIEF DESCRIPTION OF THE DRAWINGS

These and other advantages of the invention will be more apparent from the following description in view of the drawings. A reference numeral may be repeated in more than one drawing for depicting similar structures.

FIG. 1 is an exploded view of a tensioning apparatus including an annular nut member attachable to a shank member by an interference fit.

FIG. 2 is an expanded view of the details of a fluid passageway formed in the annular nut member of FIG. 1.

FIG. 7 is a cross-sectional view of an annular member having a plurality of grooves along its bore and having seals at opposed ends of the bore.

DETAILED DESCRIPTION OF THE INVENTION

Figure 3:
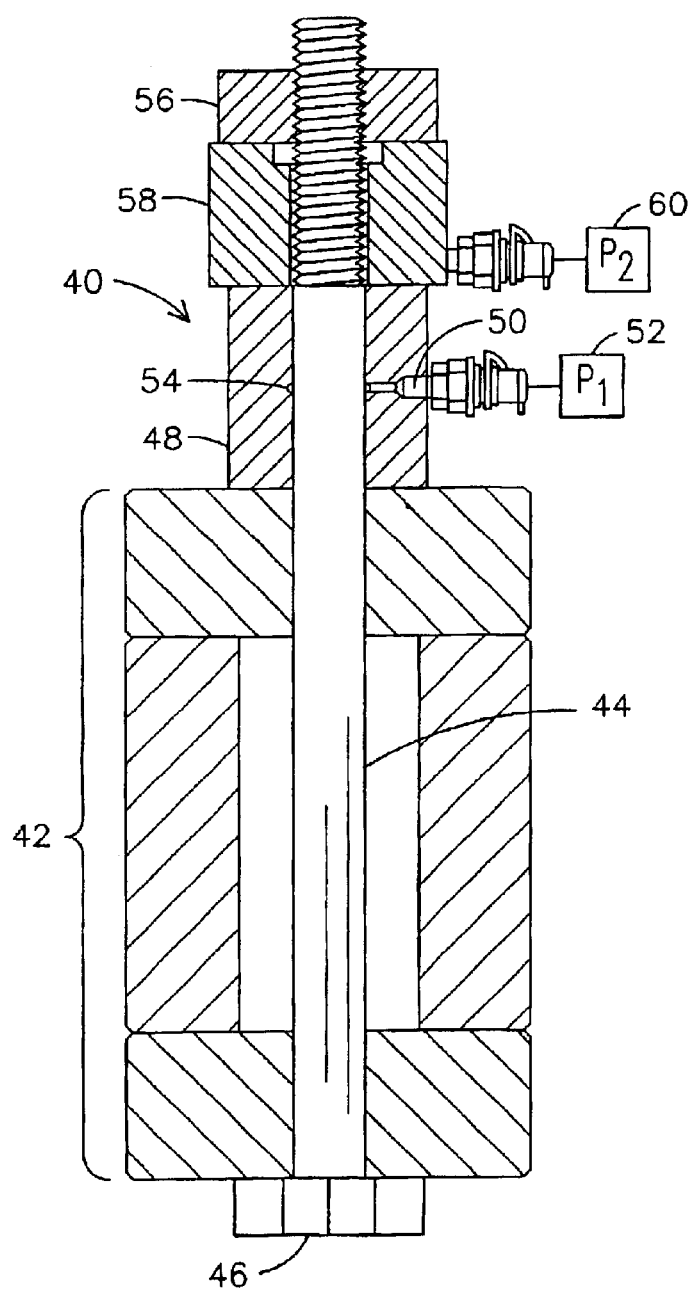
FIG. 3 is a sectional view of a tensioning apparatus being installed onto a flange assembly using a hydraulic tensioner that applies the tensile force through the unthreaded annular nut member.

The term "shank member" when used herein is meant to include elongated tension members such as bolts, studs, rods and the like whether or not they include an integral head or threads. A shank member has opposed ends, with each end having a mechanism for applying respectively opposed forces across a joint to produce a tension load in the shank. Such mechanisms may include an integral head or threads for threaded connection with a threaded nut. The term "nut" when used herein is meant to include an annular member defining an opening for receiving a shank member. The term nut is generally used in the art to denote an annular member having threads formed on its inside surface for threaded engagement with a shank member. However, in the present application, the term nut may also be used to denote an annular member having no threads on its inside surface, but rather being engaged with a shank member by an interference fit.

FIG. 1 illustrates a tensioning apparatus 10 including a shank member 12 and an annular member 14. The annular member 14 has an unthreaded inside surface 16 defining an opening 18 for receiving the shank member 12, with the opening 18 being sized to provide an interference fit connection between the shank member 12 and an unthreaded critical diameter portion 36 of the annular member 14. The shank member 12 functions as a stud and the annular member 14 functions as a nut because it grips the stud to transfer a tensile force across a flanged joint (not shown). However, the shank member 12 and annular member 12 lack the mating threads that are normally found in a typical prior art stud/nut arrangement. Rather, the interference fit between the shank member 12 and the annular member 14 provides sufficient friction for resisting relative motion there between when the shank member 12 is placed into tension between the annular member 14 and a threaded nut 30 on an opposed side of the joint.

Figure 10:
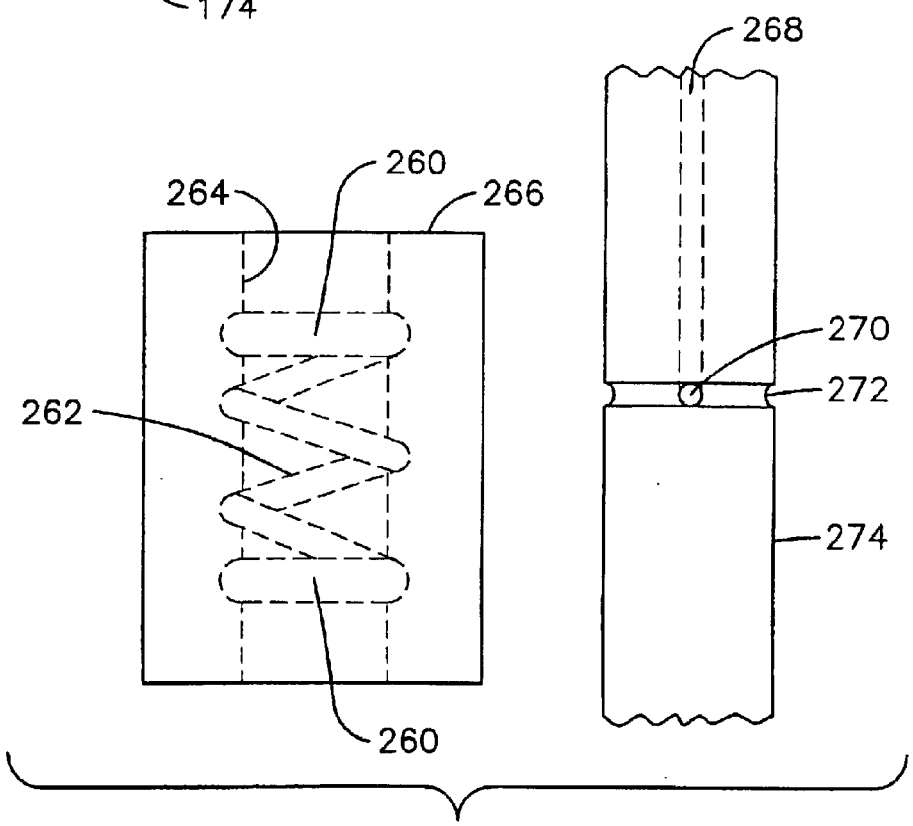
FIG. 10 is a plan view of a shank and annular member illustrating the locations of fluid passageways.

In order to facilitate a flange tensioning process using the tensioning apparatus 10, a means is provided for conveying fluid pressure into the opening 18 to selectively expand the annular member 14 to relax the interference fit, thus selectively allowing relative motion between the annular member 14 and the shank member 12 while the shank member 12 is being pre-tensioned. One such means is illustrated in FIG. 1 as a fluid passageway 20 formed through the annular member 14 from an outside surface 22 of the annular member 14 to the inside surface 16. As can be seen most clearly in the expanded view provided in FIG. 2, fluid passageway 20 includes a hole 24 formed from the outside surface 22 to the inside surface 16 and a groove 26 formed along the inside surface 16 to be in fluid communication with the hole 24. The hole 24 is connected to a supply of pressurized fluid. Groove 26 extends 360° around the circumference of opening 18 to apply the fluid pressure evenly around the circumference of the inner surface 16. One or a plurality of interconnected grooves 26 may be formed along the inside surface 16 to direct the fluid pressure across an appropriate area of the inside surface 16 so that the annular member 14 may be selectively expanded an amount sufficient to allow movement along shank member 12 without creating unacceptably high stress concentrations within the annular member 14 or shank member 12. In one embodiment, groove 26 may be formed in a single plane lying generally perpendicular to the axis of the shank member 12. In another embodiment, the groove may have a spiral shape deviating somewhat above and below such a plane at various points about the circumference of the inside surface 16. Alternatively, as illustrated in FIG. 10, two spaced apart circumferential grooves 260 may be joined by a helical shaped groove 262 formed on the inside surface 264 of the annular member 266, with the fluid pressure being supplied either through a hole formed in the annular member or through a longitudinal hole 268 in fluid communication with a radial hole 270 and mating outside surface groove 272 formed on the shank member 274.

Tensioning apparatus 10 may be made from any appropriate material and may have any size required for a particular application, using materials and stress calculations known in the art. A desired clamping force across the joint is generally determined first, then a size and material selected for shank member 12 to accommodate the clamping force. In this embodiment, shank member is formed as a stud with no integral head. Threads 28 are formed on a first end of shank member 12 for receiving a mating threaded nut 30. Alternatively, an integral bolt head (not shown) may be formed on this end of the shank member 12. Threads 32 are also formed on the opposed second end of shank member 12 for engagement with a hydraulic tensioner, as will be described more fully below. These threads 32 may also be used to engage a threaded lock nut 34 positioned to be in contact with the annular member 14 as a secondary back-up support in the event of slippage of the interference fit once the shank member 12 is tensioned against the annular member 14.

A portion 36 of the shank member 12 where the annular member 14 will reside during use will have an outside diameter that interfaces with the corresponding inside diameter of the opening 18 to establish the desired interference fit during use of the tensioning apparatus 10. The mating portion 36 of the shank member 12 may be finished machined to a desired diameter with a desired surface finish, and then the bore opening 18 of the annular member 14 may be ground to suit so that the interference fit can be carefully controlled. Alternatively, the diameter of the shank member 12 may be controlled to match the inside bore opening 18 of an annular member 14. In an exemplary embodiment using a shank member 12 having a diameter of approximately 1.5 inches, the diameter of opening 18 (excluding the groove 26) may be formed to a diameter that is between 0.0035–0.0037 inches less than portion 36 of the shank member (nominal 3.6 mils interference). Interference fits of 0.001–0.004 inch per inch of stud diameter may typically be used depending upon the application. The interference is selected to provide sufficient frictional resistance plus a desired margin to adequately support the shank pre-load once the tensioning apparatus 10 is assembled and tensioned across a joint. The necessary interference may be calculated by one skilled in the art using known Compound Thick Cylinder Theory calculations as are explained in many mechanics textbooks. (for example, "The Mechanics of Materials" by Lancaster & Mitchell, published by McGraw-Hill Publishing Company, 1967) The initial assembly of the annular member 14 onto the shank member 12 can be accomplished at the point of manufacture or elsewhere by heating the annular member 14 (and/or cooling the shank member 12) a sufficient amount to allow thermal expansion/contraction to overcome the interference and to allow the annular member 14 to be positioned over the critical diameter portion 36. Once the parts thermally equilibrate to ambient temperature, the interference fit is reestablished. Once the annular member 14 is fit onto the shank member 12, the important surfaces 16, 36 are protected from damage due to mishandling. A thermal gradient may be used to relax the interference fit during the pre-loading of the tensioning apparatus 10 in lieu of a pressure gradient, however, the simplicity, speed and controllability of a pressure-based system makes it preferred over such a temperature-based system.

FIG. 3 illustrates a tensioning apparatus 40 being installed across a flange joint assembly 42. The tensioning apparatus 40 includes a shank member 44 having an integrally formed head 46, i.e. commonly called a bolt. The head 46 functions as a means for transferring force against a first side of the flange assembly 42. Alternatively, threads and a removable nut, with or without a washer, may provide this function in order to simplify the installation of the tensioning apparatus 40 into the flange joint assembly 42. Alternatively, a shank member may be threaded into a threaded hole in the flange. These various alternatives for applying force to the side of the joint opposed the annular member 48 are all within the scope of the present invention. The shank member 44 passes through the flange joint assembly 42 and is captured at ambient temperatures by an interference fit with annular member 48. The term ambient temperature is used herein to include both the room temperature during installation and the operating temperature of the shank 44 and nut 48 during the subsequent use of the device that includes flange assembly 42. In some applications the installation and operating temperatures may be significantly different, and the required interference fit and the required working fluid pressures described below must be chosen with such temperatures in mind. Annular member 48 includes a fluid passageway 50 for conveying fluid pressure $P_1$ from a supply of pressurized fluid 52 into an opening such as groove 54 between the annular member 48 and the bolt 44 for selectively expanding the annular member 48 to relax the interference fit. A tensioner nut 56 is threaded onto the distal end of the shank member 44 opposed the head 46, and a tensioner 58 is positioned between the tensioner nut 56 and the annular member 48. Tensioner 58 may be a mechanical device or a commercially available hydraulic tensioner that is powered by pressure $P_2$ from a source of hydraulic pressure 60. The fluid connections may be made through quick release high-pressure fittings as are known in the art. The flange joint assembly 42 is closed and tensioned by applying pressure $P_2$ to tensioner 58 to cause axial expansion between tensioner nut 56 and annular member 48 while pressure $P_1$ is applied to relax the interference fit so that shank member 44 is free to slide axially within the annular member 48 as shank member 44 is pre-loaded and stretched. When the annular member 48 expands, there may be some leakage of the fluid used to provide pressure $P_1$ from between the two mating surfaces. However, by positioning groove 54 proximate the axial center of annular member 48, such leakage may be minimized since the pressure will cause annular member 48 to expand somewhat more near its center, thus allowing the opposed axial ends of the mating surfaces to maintain light contact for limiting fluid leakage. Once a desired amount of tensile force is developed in bolt 44, the pressure $P_1$ is dropped to zero to re-establish the interference fit in order to hold the pre-load, and then pressure $P_2$ is dropped to zero and tension nut 56 and tensioner 58 are removed. The pre-load can be released without the use of tensioner 58 by simply providing pressure $P_1$ to the fluid passageway 50 to allow annular member 48 to expand and to slide axially along shank member 44. A backup nut may be threaded onto the bolt 44 to make contact with annular member 48 once tensioner nut 56 and tensioner 58 are removed in order to provide added assurance against an unintentional release of the pre-load.

Advantageously, the tensioner 58 applies the reaction force for the tension preload directly through the annular member 48 without the need for a bridge, jackbolts, or a complicated multi-piece nut assembly. This arrangement is facilitated by the fact that the annular member 48 need not be rotated during the tensioning process. The tensioner tool 58 pulls on the shank member 44, either directly or through a tensioner nut 56 as in this embodiment, to impart force against the far side of the flange assembly 42 while pushing against the near side of the flange assembly 42 through the annular member 48. Forces are thus imparted on the flange assembly 42 during the tensioning process in the same location and in the same manner as such forces are imparted when the flange assembly 42 is in use. Furthermore, annular member 48 contains no elaborate internal seals and no critical load-bearing threads within the tensioning apparatus load path. The absence of load-bearing threads and jackbolts keeps stresses in the various parts to a generally low level without deleterious stress concentrations.

By imparting the tensioner load directly through the annular member 48 rather than through a parallel load path such as a bridge, the present invention advantageously eliminates an important variable from the joint tensioning process. It is known with prior art systems that when the tensile load is transferred from the bridge or equivalent structure to the nut after the bolt is tensioned, there will be some physical movement or seating of the nut. The effect of the nut seating is that the tensile load/elongation of the shank member will be relaxed to a degree. To accommodate this relaxation, the bolt must be somewhat overstressed by the tensioner operating through the bridge so that the resultant pre-load of the bolt after the nut seats will be the desired value. Such overstressing of the bolt is not necessary with the present invention because the load is directed by the tensioner through the nut 48, thereby causing the nut 48 to seat in during the application of the pre-load. Furthermore, the system of the present invention provides a highly repeatable degree of pre-load in the shank member, for example repeatable to within 1% of the preload value. The hydrostatic film developed between the annular member and the shank member virtually eliminates friction there between during the tensioning process. Accordingly, the full tension developed by the tensioner is transferred to the annular member, and so to the bolt. This was confirmed by comparing the readings from strain gauges attached to the bolt against tensioner calibration data.

With prior art systems, the total bolt elongation during tensioning must be equal to the final required bolt elongation plus the expected deflection of the nut as it seats in. An overstress ratio or tensioner inefficiency ratio may be defined as:

(nut deflection+required bolt elongation)/require bolt elongation.

The working fluid pressure in the tensioner must be adjusted upward to account for this inefficiency. Furthermore, the impact of the nut deflection is more pronounced for a short bolt than for a longer bolt. For example, a 40 inch long bolt having a 3 inch nominal bolt diameter will exhibit an elongation of 0.060 inch when pre-loaded to a desired value. To achieve the required pre-load in the bolt, a tensioner working fluid pressure of 20,000 psi may be required with a particular tensioner. However, the expected nut deflection of 0.007 inch (112% overstress ratio) necessitates a further stretching of the bolt, thus necessitating an increase of tensioner working fluid pressure to 22,400 psi. For the same bolt diameter but with only a 10 inch bolt length, the elongation under the desired pre-load would be 0.015 inch. This elongation plus the expected nut deflection of 0.007 inch results in an overstress ratio of 147%. The overstress ratio is higher for the shorter bolt because the required bolt elongation gets smaller while the nut deflection stays constant. The working fluid pressure required in the tensioner to achieve this amount of overstress is 29,333 psi for this example. Thus, with prior art systems it is necessary to use a different working pressure in the tensioner for each different length of bolt. The present invention avoids this variable by causing the nut to seat during the tensioning process, thereby allowing the tensioner working fluid pressure to be determined by the required pre-load alone. Thus, the same working fluid pressure may be used for any given bolt diameter/pre-load regardless of the bolt length. It must be understood that the tensioner used to apply this pressure must be able to accommodate different elongation values for different bolt lengths, however, the force applied by the tensioner to achieve a given pre-load will be the same for all bolt lengths without regard for an overstress ratio.

Figure 4:
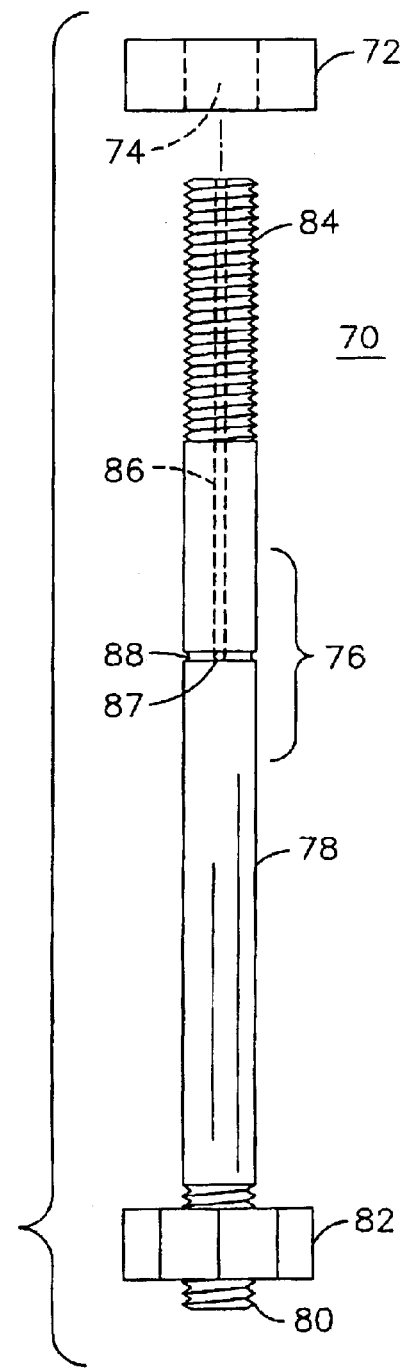
FIG. 4 is an exploded view of a tensioning apparatus including a shank member having a fluid passageway used for selectively expanding and an interference fit with an annular member.

FIG. 4 illustrates another embodiment of a partially assembled tensioning apparatus 70 having an annular member 72 defining an opening 74 (hidden but shown in phantom) sized to have an interference fit with a mating portion 76 of a shank member 78. The shank member 78 is a stud with a threaded end 80 engaged with a nut 82 and an opposed threaded end 84 available for engagement with a hydraulic tensioner (not shown). In this embodiment, a fluid passageway is formed to include an axial hole 86 extending from an end of the shank member 78 and intersecting a radial hole 87. The radial hole 87 extends to intersect a groove 88 formed along the outside surface of the shank member 78 within the mating portion 76. A fluid pressure may be applied through the fluid passageway 86, 87, 88 to selectively expand annular member 72 sufficiently to relax the interference fit.

Figure 5:
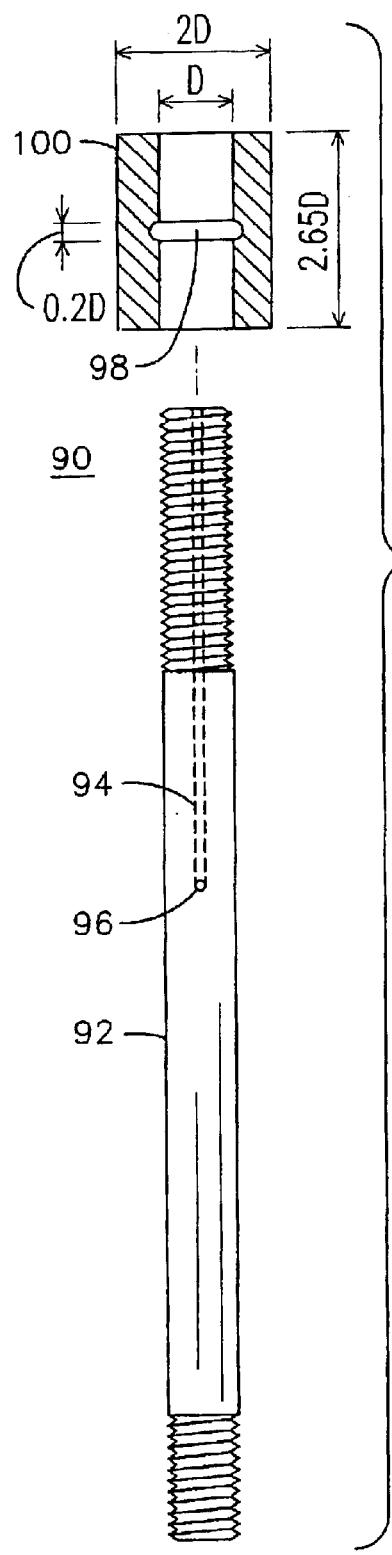
FIG. 5 illustrates a tensioning apparatus including a shank member having a fluid passageway opening into a groove formed in the bore of an annular member.

FIG. 5 illustrates another embodiment of a tensioning apparatus 90 including a stud shank member 92 having an internally formed fluid passageway 94. The fluid passageway 94 extends along the axial length of the shank member 92 (seen in phantom) to a radial hole 96. The passageway 94 is in fluid communication with groove 98 formed 360° circumferentially around the inside surface of the annular member 100. When annular member 100 is in position with an interference fit around shank member 92, the groove 98 will be aligned with hole 96 and in fluid communication with fluid passageway 94. Groove 98 has an axial extent that is sufficient to permit axial movement between annular member 100 and shank member 92 during tensioning of shank member 92 while still maintaining fluid communication between fluid passageway 94 and groove 98. In one embodiment, for a shank member 92 having diameter D, annular member may have diameter of approximately 2 D and a height of approximately 2.65 D, and groove 98 may have an axial extent of approximately 0.2 D.

Figure 6:
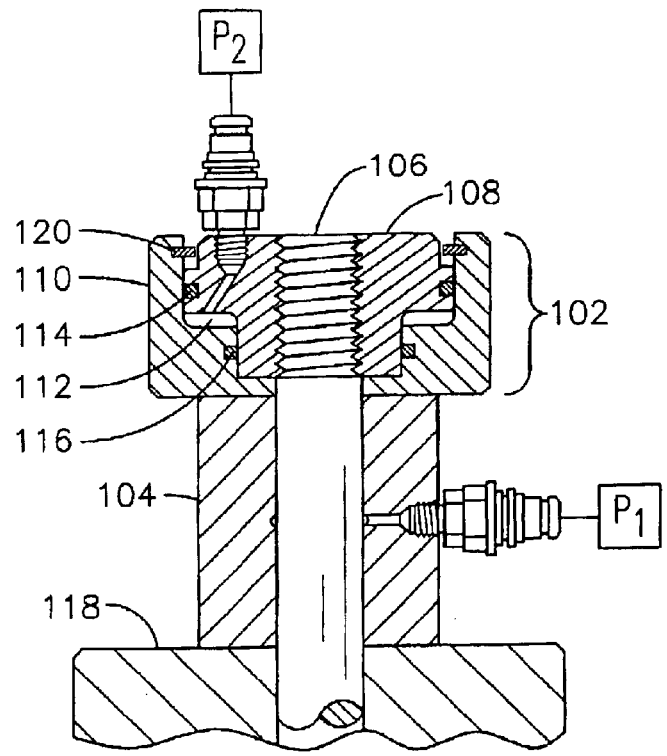
FIG. 6 is a cross-sectional view of a low-profile tensioner bearing upon an annular member to perform a tensioning operation while the annular member is expanded to relax its interference fit with a shank member.

FIG. 6 illustrates the use of a low-profile tensioner 102 that bears upon an annular member 104 to perform a tensioning operation while the annular member 104 is expanded by an applied hydraulic pressure $P_1$ to relax its interference fit with a shank member 106. The tensioner 102 includes a piston portion 108 threadably engaged with shank member 106 and moveable within a cylinder portion 110 in response to fluid pressure $P_2$. The fluid pressure is maintained in pressure chamber 112 by upper seal 114 and lower seal 116, causing piston 108 to move upward to pre-load shank member 106 and flange while applying a reaction force downward directly against annular member 104. Sample calculations performed for a shank member having a diameter of 1.5 inch demonstrate that a shank prestress of 45,000 psi can be achieved with a working pressure $P_2$ of 20,000 psi and a tensioner piston area of 3.976 in². This arrangement requires an inner seal diameter of 2.25 inch and an outer seal diameter of 3.182 inch, and a tensioner outside diameter of 3.8 inches. Shank elongation of 0.023 inches is required to achieve the target preload with a shank effective length of 15.25 inches, and this would necessitate an overall height of the tensioner 102 of only about 1.5 inches. Retainer 120 may accommodate a conservative overall piston travel limit of 0.1875 inch to keep piston 108 and cylinder 110 together when not in use. With annular member 104 having a nominal diameter of 3 inches, the nut contact stress would be 15,000 psi.

FIG. 7 is a cross-sectional view of an annular member 130 that may be used with a tensioning apparatus as described above. The annular member 130 includes an outside surface 132 and an inside surface 134 defining a generally cylindrical bore for accepting a shank member in an interference fit. A plurality of grooves are formed along the inside surface 134. A first groove 136 is formed along an axial centerline of the annular member 130 and is in fluid communication with a hole 138 used to deliver a fluid pressure into the bore. A second groove 140 is formed to be essentially parallel to the first groove 136 and is in fluid communication with the first groove 136, such as by being interconnected therewith via longitudinal groove 142. Additional axial and longitudinal grooves may be provided as desired to achieve a desired distribution of the pressure applied through hole 138 across the bore. The grooves are shaped to avoid stress concentrations, for example by having a radius (e.g. 0.06 inch) that is greater than a depth (e.g. 0.04 inch) so that the edges form less than a right angle. The edges may be given a further radius (e.g. 0.02 inch) to eliminate any sharp edge. In one embodiment, three axial grooves 136, 140, 144 are interconnected by two longitudinal grooves 142 that are diagonally opposed from each other and equally spaced from hole 138. Grooves 140, 144 may be located closer to their respective axial ends of annular member 130 than to groove 136 located at the axial centerline in order to facilitate the expansion of the bore over the majority of its length, leaving only relatively small end areas of the insider surface 134 to function as a seal for maintaining the pressure within the bore. In one embodiment for an annular member 130 having an axial length of 4 inches, the end grooves 140, 144 may be axially removed from the axial centerline groove 136 by about 1.2 inches respectively, leaving about 0.8 inches from the centerlines of grooves 140, 144 to the respective axial ends of the annular member 130.

In order to reduce or to eliminate leakage of the pressurized fluid from between the annular member 130 and a mating shank member (not shown in FIG. 7) when the bore is pressurized during a tensioning operation, it may be desired to add a seal 146 at opposed axial ends of the bore.

O-ring seals 146 are illustrated as being inserted into respective grooves 149 formed along the inside surface 134 of the annular member. Alternatively, such grooves may be formed in the mating shank member. Other types of seals may be used, for example lip seals, bellows seals, spring seals, brush seals, etc. and they may be formed of any known material appropriate for the environmental conditions of the particular application. Such seals are preferably located close to the axial ends of the annular member 130, for example 0.1 inch on center from the respective end.

Figure 8:
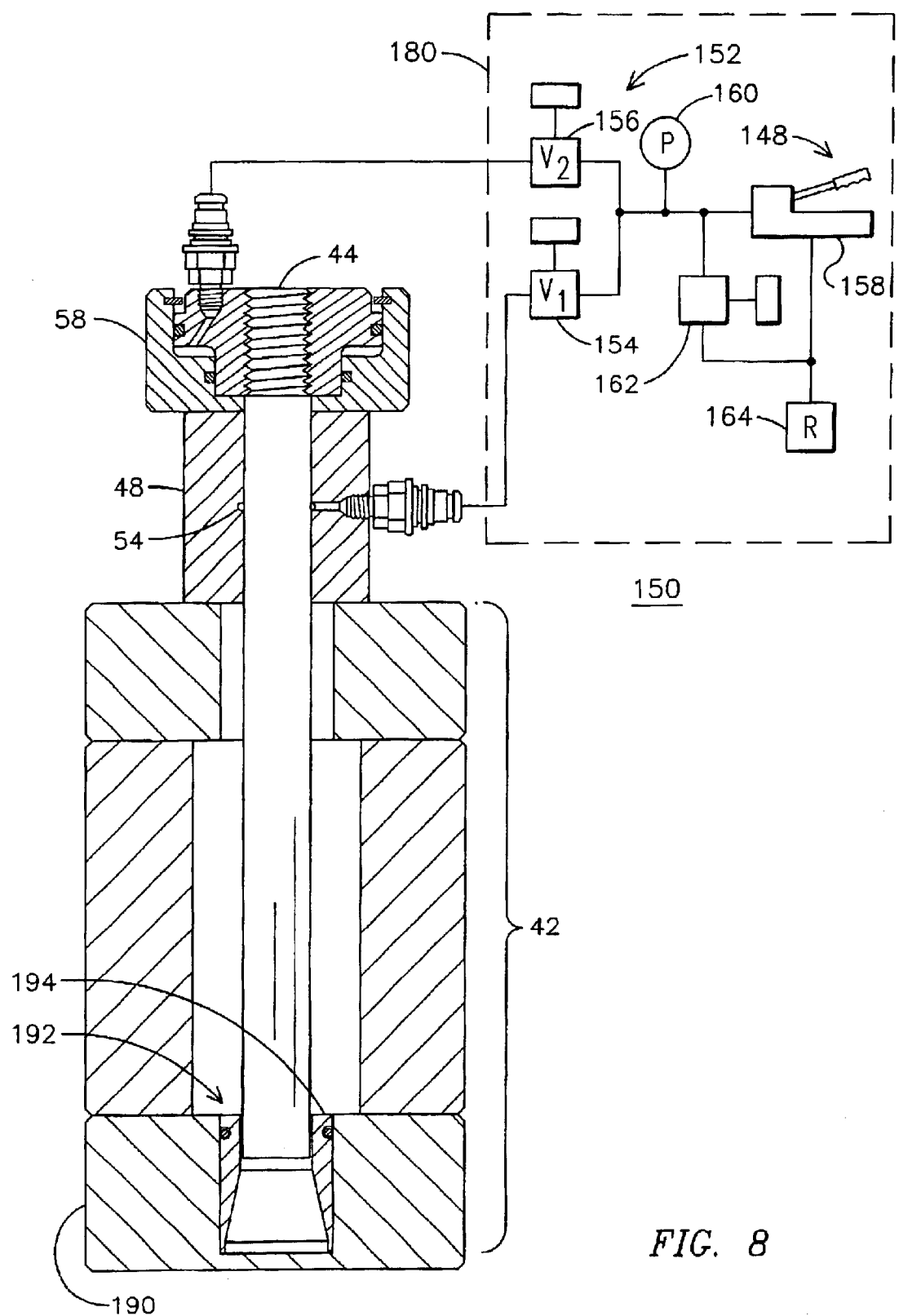
FIG. 8 is a sectional view of a tensioning apparatus being powered by a single source of high-pressure fluid selectively fluidly connected to the annular member and/or to the tensioner through valves.

A flange tensioning system 150 is illustrated in FIG. 8 in a configuration that utilizes a single source 148 of fluid pressure P that is selectively fluidly connected to the annular member 48 and to the tensioner 58 through a valve arrangement 152 such as needle valves 154 and 156 respectively connected to the annular member 48 and tensioner 58. The source of pressure 148 may include a high-pressure hand pump 158 that is manually operated with reference to a pressure gauge 160. A bypass valve 162 is provided around pump 158 to return fluid to reservoir 164.

In one test configuration, a 1.50 inch diameter X 8UN (American standard) bolt was tensioned using a Model 48000-0001-000 hydraulic pump manufactured by Hydratight Sweeney Limited using mineral oil as a working fluid. A 3.00 inch outside diameter nut was machined to provide an interference fit of 0.0035–0.0037 inches with the critical length portion of the shank member 44. The critical length portion of the bolt was machined to 1.625 inches. The nut had an aspect ratio of 3.0 and was formed with three circumferential spaced-apart grooves interconnected by two axial grooves in fluid communication with a hole drilled through the nut wall to its outside surface. The nut was assembled onto the bolt and the needle valve 154 was opened with needle valve 156 closed and the system was pressurized to 32,000 psi to establish an oil film between the nut and bolt, at which point the nut 48 was expanded sufficiently to relax the interference between nut 48 and shank member 44 to allow relative movement there between. Valve 154 was then closed. The nut 48 was able to retain the pressurized oil in the groove 54 because the viscosity of the oil is increased at this high pressure and the oil film developed between the nut 48 and the shank member 44 is retained without significant leakage. An oil film thickness of 0.000585 inches was calculated. There is an upper limit on the pressure that can be developed within groove 54, because at a certain point, dependent upon the geometry and the fluid characteristics, any further attempt to increase the pressure simply causes fluid to escape from between the nut 48 and shank member 44, and further action of the pump 158 simply pumps fluid through the system.

Needle valve 156 was then opened on the test configuration and the pressure in the system dropped as the fluid pressurized the tensioner 58. The pump 158 was operated to recover the pressure to 21,500 psi, thereby tensioning the shank member 44 to 45,000 psi, as confirmed by measurements taken from a strain gauge. The fact that the shank member 44 was properly stretched confirmed that the pressure in groove 54 had been maintained to a level sufficient to keep the interference fit relaxed. As a result of the Poisson ratio effect, the diameter of the shank member 44 is reduced as it is tensioned to 45,000 psi. As the bolt diameter is reduced, the pressure in groove 54 will decay somewhat from the original 32,000 psi due to the larger volume occupied by the trapped fluid. However, the pressure needed to release the interference fit is also reduced as the bolt diameter is decreased. Advantageously, the test configuration components were designed so that the decreasing pressure existing in the groove 54 as the shank member 44 was stretched remained adequate for keeping the interference fit relaxed as the bolt diameter decreased. Note also that the peak pressure that can be maintained in the groove 54 when the shank member 44 is stretched will be less than that which be maintained when the shank member 44 is unloaded.

Valve 154 was then reopened with valve 156 still open to bring the pressure in groove 54 to 21,500 psi. Note that this pressure is less than the 32,000 psi originally used to establish the oil film between the nut 48 and shank member 44 and to initially release the interference fit. The tensioner 58 was purposefully designed to provide the desired tension in the shank member 44 at a working fluid pressure that is no more than the working fluid pressure needed to relax the interference fit once the shank member 44 is stretched. Thus, the test configuration system can be operated with a single source of working fluid pressure 148 that supplies both the tensioner 58 and the annular member 48 because the pressure of 21,500 psi is adequate for both stretching the shank member 44 and for eliminating the interference fit once the bolt is stretched. Once the shank member 44 is tensioned, valve 156 is closed to maintain the pressure in the tensioner 58, the system pressure is reduced to zero, such as by opening bypass valve 162, and valve 154 is opened to release the pressure in the groove 54 and to reestablish the interference fit. It takes a finite amount of time for the working fluid to move out of groove 54 through fluid passageway 50. In the test configuration, it was found that two minutes after opening valve 154 the interference fit had returned to the point where the tensioner 58 could be depressurized by opening valve 156 without movement of the nut on the shank. This was confirmed by the fact that the strain gauge was still indicating that the bolt was correctly pre-loaded. It is anticipated that the degree of interference will gradually increase to its full potential over time as the oil film between the nut and bolt gradually flows out of fluid passageway 50. A time period of one hour was found to be adequate to develop the full load-carrying capability of the interference fit when mineral oil was used as the working fluid. The stud-over-nut length, i.e. the distance that the bolt extends above the top of the nut, may be measured after completion of the tensioning operation to confirm proper functioning of the system. The stud-over-nut length will increase to a predetermined value once the bolt is properly pre-loaded. For the test configuration, the initial stud-over-nut length with the bolt relaxed was 1.440 inches, and it increased by 0.032 inches after the bolt was stretched. To release the pre-load, pressure is re-established between the shank member 44 and the nut 54. When the interference is relaxed sufficiently to allow relative movement between the shank member 44 and the nut 54, an audible click may be heard indicating that the preload has been relaxed. Advantageously, the pre-load may be relaxed without the use of the full tensioning system 150, since all that is required to unload the pre-load is that an adequate pressure be provided to the nut 54. This may be helpful for applications such as gas turbine casing flange bolts where an unexpected outage may necessitate the rapid disassembly of the turbine.

FIG. 6 illustrates how the relationship between the pressure $P_2$ provided to the pressure chamber 112 and the tensioning force exerted on a shank member 106 can be affected by selecting the geometry of the pressure chamber 112 so that a desired cross-sectional area of piston 108 is exposed to the pressure $P_2$. In practice, a bolting system may be designed by knowing the required closing force; selecting a shank member to carry that closing force; designing an annular member to have an interference fit sufficient to resist the closing force; determining the amount of working pressure needed to release the interference fit once the shank member is stretched under the closing force; and then designing a tensioner to provide the desired closing force tension on the shank member with a working fluid at that working pressure. For the test configuration described above, the tensioner was designed to have a piston area of 2.675 in$^2$.

Figure 9:
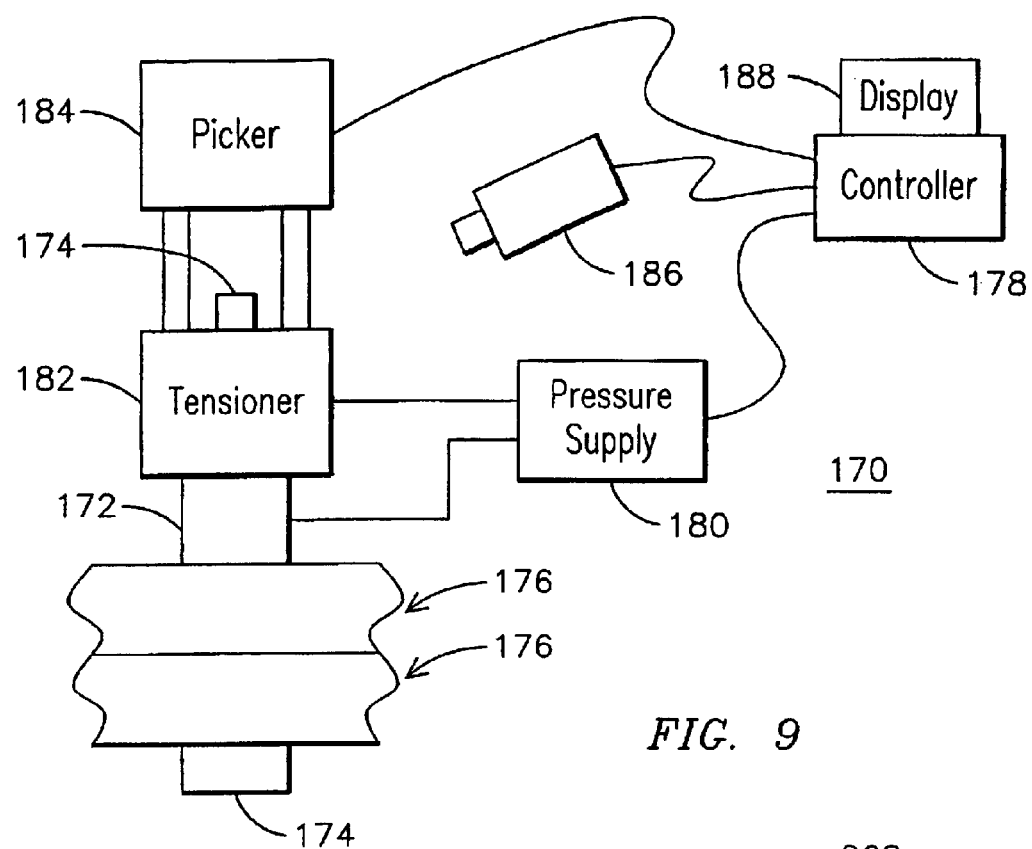
FIG. 9 illustrates a method of tensioning a shank using the system of FIG. 8.

The tensioning apparatus of the present invention is adaptable for remote tensioning applications, such as underwater, nuclear or other hazardous environments, because there is no need to rotate the nut to achieve tensioning, because there is no need for a bridge to carry the load between the bolt and the tensioner, and because the critical surfaces between the nut and shank are protected. One such remotely controlled system 170 illustrated in FIG. 9 provides hands-free tensioning of nut 172 and bolt 174 across flanged joint 176. A controller 178 is programmed to sequence the operation of a pressure supply 180 for providing fluid pressure to the nut 172 and tensioner 182. The pressure supply 180 may include a pump or other supply of pressurized fluid, and one or more remotely controllable valves, such as the components included within the dashed lines in FIG. 8. The controller 178 may also be used to control the operation of a robotic arm 184 for picking/placing the tensioner 182 into position on the bolt 174. A camera 186 may be used to provide visual information on display 188 for use by an operator. Remote tensioning is further facilitated by the use of a blind hole 192 in the bottom flange member 190 for receiving shank member 44. A tapered collet assembly 194 is installed on the distal end of shank member 44 for making frictional engagement with the bottom flange member 190 as the shank member 44 is tensioned. An alternative embodiment may use a shear pin assembly as described in U.S. Pat. No. 6,287,079 for engagement with the blind hole 192. For embodiments with a through hole in the bottom flange member, a split ring or split nut assembly may be used to engage the shank member for ease of remote assembly.

The use of a single source of pressure 148 as shown in FIG. 8 provides a passive protection against overstressing of the shank member 44. This occurs when both valves 154 and 156 are open and the pressure being supplied to the tensioner 58 and to the nut 48 is thereby equilibrated. In the event that the system pressure inadvertently begins to rise beyond the design value, the shank member 44 will elongate due to the increasing pressure in the tensioner 48. As a result of Poisson's ratio, the bolt diameter will also decrease, thus causing the maximum pressure-retaining capability of the nut 48 to decrease and causing leakage of the working fluid from between the nut 48 and shank member 44. This interaction is self-limiting on pressure, since as the pressure increases, the pressure retaining capability of the nut will also decrease causing increasingly more leakage, until finally the system's volume capacity is exceeded and the pressure increase is self-terminated.

Systems built to date have used mineral oil as the working fluid. Other working fluids may be envisioned. Water may be used as a working fluid provided the materials of construction of the various components of the system are not subject to corrosion. Water with additives such as corrosion-prohibiting formulas may be used. Water may exhibit a lower viscosity at high pressures than does mineral oil, thereby reducing the amount of overpressure needed to establish a fluid film between the nut and shank upon initial pressurization. Furthermore, water may require less time to flow away from the nut once pressure is reduced to zero, thereby achieving maximum holding capability in a shorter time after depressurization than would a system using mineral oil.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A tensioning apparatus comprising:
   a shank member for carrying a tensioning force along a longitudinal axis for preloading an assembly, the shank member comprising a first diameter along a portion in a tensioned state carrying the tensioning force and a second diameter greater than the first diameter along the portion in a relaxed state not carrying the tensioning force;
   an annular member comprising a surface in contact with the assembly and an opening sized to receive the shank member portion with an interference fit for transferring the tensioning force from the shank member through the annular member into the assembly to preload the assembly, the shank member first diameter and the annular member opening providing an interference fit sufficient to prevent relative movement there between under the influence of transferring the tensioning force;
   a fluid passageway for delivering a pressure between the shank member and the annular member for selectively expanding the opening to relax the interference fit;
   a tensioner responsive to a pressure to apply the tensioning force to the shank member;
   wherein a first pressure is required in the fluid passageway to relax the interference fit with the shank member in the relaxed state, and a second pressure lower than the first pressure is required in the fluid passageway to relax the interference fit with the shank member in the tensioned state; and wherein
   the tensioner is selected to provide the tensioning force to the shank member at the second pressure so that a single pressure is used to pressurize the fluid passageway and to pressurize the tensioner to pre-load the assembly.

2. The tensioning apparatus of claim 1, further comprising:
   a pump;
   a first valve connected between the pump and the fluid passageway; and
   a second valve connected between the pump and the tensioner.

3. The tensioning apparatus of claim 1, wherein the tensioner further comprises:
   a piston disposed within a cylinder to define a pressure chamber;
   a first of the piston and cylinder connected to the shank member for applying the force to tension the shank member and a second of the piston and cylinder connected to the annular member for applying a reaction force through the annular member.

4. The tensioning apparatus of claim 3, further comprising:
   a pump;
   a first valve connected between the pump and the fluid passageway; and a second valve connected between the pump and the pressure chamber.

5. The tensioning apparatus of claim 4, wherein the pump, first valve and second valve comprise a pressure supply, and further comprising a controller for remotely operating the pressure supply.

6. The tensioning apparatus of claim 1, wherein the tensioner comprises a first member pulling on the shank member and a second member pushing on the annular member to apply the tensioning force.

* * * * *